United States Patent [19]

Cox et al.

[11] 4,317,962

[45] Mar. 2, 1982

[54] DISTRIBUTED CONTROL FOR DIGITAL SWITCHING SYSTEM

[75] Inventors: John E. Cox, Stamford, Conn.; Robert Treiber, Long Island, N.Y.; John M. Cotton, East Norwalk, Conn.

[73] Assignee: International Telephone and Telegraph Corporation, New York, N.Y.

[21] Appl. No.: 56,752

[22] Filed: Jul. 12, 1979

Related U.S. Application Data

[63] Continuation of Ser. No. 888,252, Mar. 17, 1978, abandoned, which is a continuation of Ser. No. 773,712, Mar. 2, 1977, abandoned.

[51] Int. Cl.³ .......................... H04J 3/12; H04Q 3/54; H04Q 11/04
[52] U.S. Cl. .................... 179/18 ES; 370/58; 370/110.1
[58] Field of Search ............. 179/18 FC, 18 ES; 370/56, 110, 58, 68, 67

[56] References Cited

U.S. PATENT DOCUMENTS

| | | | |
|---|---|---|---|
| 3,223,784 | 12/1965 | Inose et al. | 370/56 |
| 3,492,435 | 1/1970 | Inose et al. | 179/18 FC |
| 3,496,301 | 2/1970 | Kaenel | 370/56 |
| 3,634,627 | 1/1972 | Velentini | 370/95 |
| 3,736,381 | 5/1973 | Johnson et al. | 370/63 |
| 3,784,752 | 1/1974 | Peron | 370/60 |
| 3,860,761 | 1/1975 | O'Neill, Jr. | 179/18 J |
| 3,862,370 | 1/1975 | Kadota | 370/63 |
| 3,912,873 | 10/1975 | Skaperda | 179/18 FC |
| 4,028,495 | 6/1977 | Funamo et al. | 370/58 |
| 4,070,551 | 1/1978 | Weir | 179/18 FC |

*Primary Examiner*—Thomas W. Brown
*Attorney, Agent, or Firm*—John T. O'Halloran; Jeffrey P. Morris

[57] ABSTRACT

A uniformly manufacturable solid state modular distributed control for a digitally switched local or central office servicing an expandable number of subscribers is disclosed in which subscriber lines and trunks communicate through a standardized hardware interface to a group switch. The described system provides microprocessor control of each call, with software distributed in accordance with the class of service per line, without the limitations of centralized control systems, but expandable without adverse affect on existing software. Switching control signals are communicated to and from the subscriber subsets to the group switch over the same paths which couple the speech signals thereto, thereby eliminating cumbersome and expensive separate control paths. In accordance with a further aspect of the present invention, subscriber calls are divided into orginating and terminating call halves, under subscriber control and separated by the group switch, thereby eliminating undesired interaction therebetween to provide for simplified software requirements.

13 Claims, 6 Drawing Figures

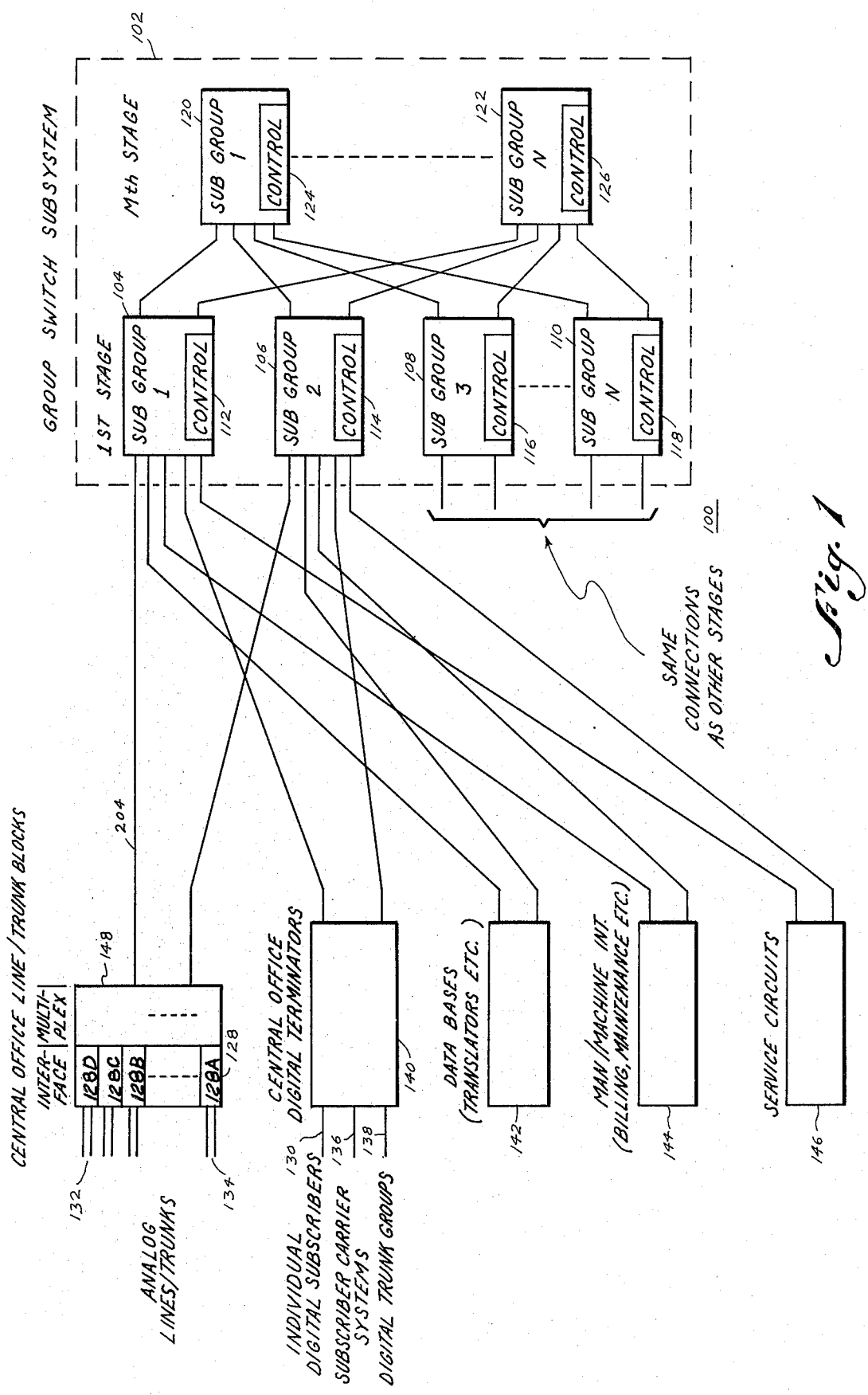

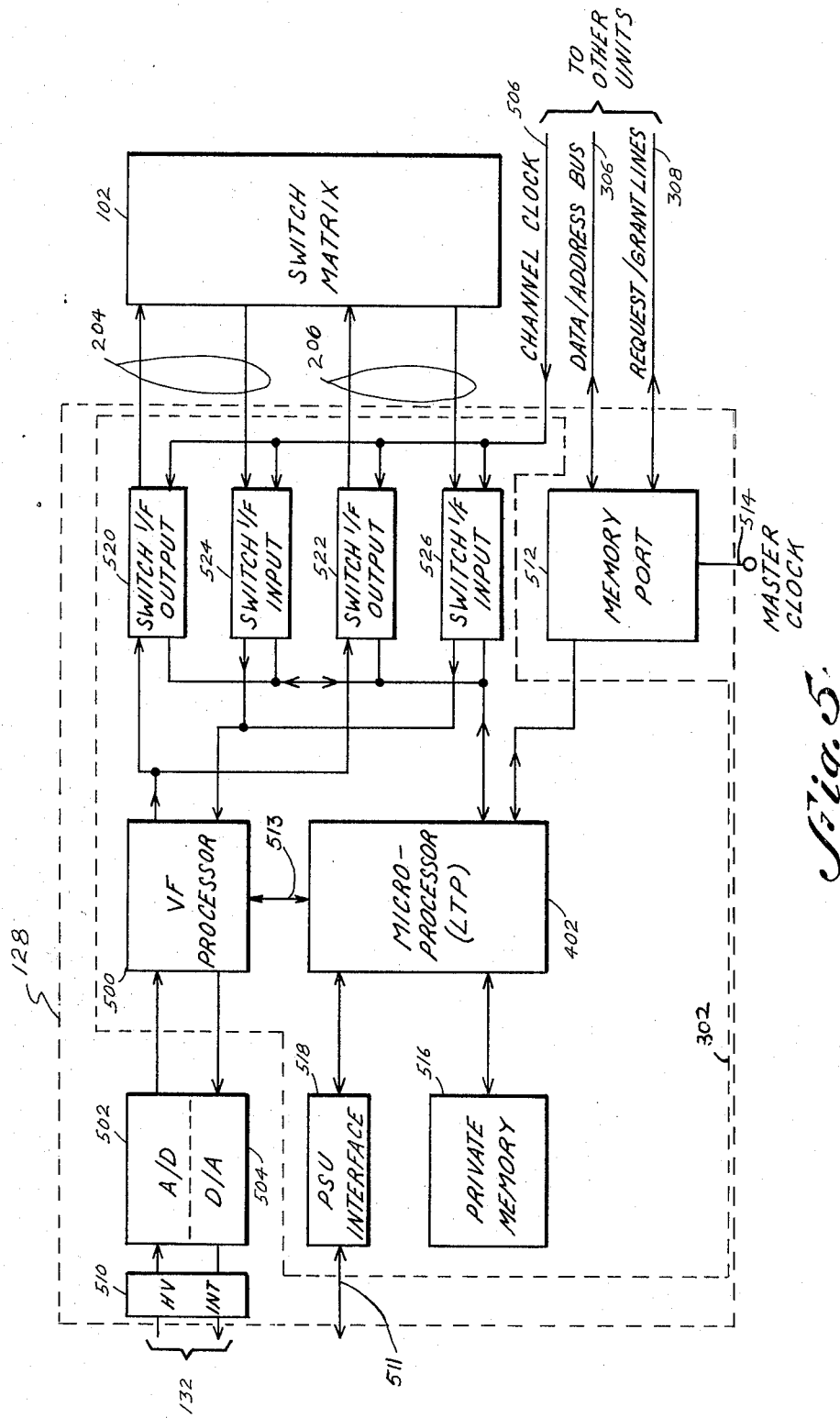

DISTRIBUTED CONTROL FOR DIGITAL SWITCHING SYSTEM

This is a continuation of application Ser. No. 888,252, filed Mar. 17, 1978, which is a continuation of Ser. No. 773,712 filed Mar. 2, 1977 both abandoned.

BACKGROUND OF THE INVENTION

1. Field of the Invention

The present invention relates generally to the field of digitally switched multiple subscriber communications systems and more particularly to a distributed control implemented on a microprocessor per line or per erlang or per security block basis, centered around a digital switching matrix. A telephone central or local office implementing the aforedescribed distributed control apparatus and method is described.

2. Description of the Prior Art

In modern telephone switching systems, it is presently required that large amounts of data indicative of the status of the lines and trunks served by such a switching system, together with required actions by the switch in response to various line and trunk status conditions be stored. Representative data is subscriber class of service, trunk class of call, subscriber restrictions, directory number to equipment number translations, equipment number to directory number translations, translation of number code to switch action, i.e. area and office code translations with alternate routes, etc. In a centralized control system of the prior art, this data is available in a common memory, which is duplicated for reliability and accessible by common control computers for serial operations upon the extracted data.

In load sharing, or multiprocessing common control systems of this prior art, more than one processor must access a common memory to obtain data at the same time. Various interference problems exist in such a system which results in an effective loss of throughput, which loss increases as the number of computers increases.

Decentralized control systems incorporating distributed control functions have evolved in the prior art. A prior art switching system wherein stored program controllers are distributed throughout the system is described by U.S. Pat. No. 3,974,343. Another prior art switching system is described by U.S. Pat. No. 3,860,761 wherein a progressively controlled switching system utilizing register control couples an entire call at a time rather than the originating and terminating call halves as described by the present invention.

Prior art systems have concentrated on obtaining a high efficiency for the processing function. Multiprocessing was brought in to provide more processing capability but still with the objective of not providing more capability than was necessary. This contributed to undesirable interactions between software packages wherein the modification or addition of a feature could interfere with the current working of other features in a largely unpredictable manner. This in turn led to a practice of exhaustive testing of software packages whenever a feature or a traffic sensitive quantity was changed (sometimes called regression testing). The larger the software packages became the more testing needed to be done, constantly retesting old features to ensure that they remained operable.

A major reason for this prior art problem lies in the common control system architectures of the prior art wherein a stored program control processing function shares itself in time between a multitude of tasks which occur on demand of the randomly originated and terminated traffic. Such architectures also permit software errors and temporary hardware errors to cause the computer program to "jump" to undesired and unpredictable memory locations, thereby disrupting the correct operations of the total software package.

In accordance with the present invention, this cycle of regression testing is eliminated by providing a system architecture which permits a processing function to be assigned to each call for the duration of that call.

In accordance with one aspect of the present invention, each call in process has its own dedicated computer system, a microprocessor, handling it independently of the other calls which are being simultaneously processed. Thus, a system architecture is achieved wherein a dedicated processor is provided per call. This dedicated processor/per call concept permits software packages to be designed such that they do not have to be interrupted to handle another call. The present invention goes further than assigning a processor function per active call in process, extending the principle to embrace the provision of a processing function dedicated to each termination (line or trunk) at the central office. The processing function may be located remotely from the central office at a remote concentration point or even in the telephone instrument.

In addition, a central communication switching path, not only for the speech signals but also for the overhead traffic, created by the need for the individual processing functions to communicate from time to time with each other and with certain centralized functions such as centrally stored data, maintenance modules, man/machine interfaces, etc. is provided.

When a plethora of processing functions operate independently but interactively with each other in a largely asynchronous manner to one another, this represents a distribution of the control function from a central location to each individual line and/or trunk termination. The communication between processing functions is via a hardware interface. Each processing function is concerned only with the features of the particular line/trunk it is assigned to serve. Thus, it can be tested once exhaustively and thereafter will continue to work with similarly tested functions via the common interface. The addition of a new feature into a processing function associated with a particular line may not function correctly (before it has been exhaustively tested) with another existing line not having the new feature but it cannot prevent two such existing lines from operating with one another because it is not involved in any way with the connection of a call between two existing lines. Sufficient hardware safeguards are present in the communications interface to detect erroneous transmissions between processing packages and bringing them to the attention of maintenance personnel. Also, it may be made impossible for one processing function to alter the operating instructions for any other processing function. In the present invention all that a processing function can do is to provide data via a hardware interface on which the distant processing function may choose to operate in accordance with its own set of stored instructions. One such hardware communication interface is the continuously expandable switching network described in the U.S. patent application of K. Geisken-J. Cotton, Ser. No. 909,583, now U.S. Pat. No. 4,173,713, a continuation of Ser. No. 766,396 now abandoned, filed on Feb. 7, 1977, and assigned to the same assignee as is the present invention.

By utilizing a processor for each termination, functions which in the prior art have required hardware logic and electromechanical and audio devices, can be done under software control by the processor. In the present invention these functions are performed on a per line/trunk basis, including but not limited to, ringing the line, tone detection and generation, testing the line, analog-to-digital conversion, etc. to permit transmission and switching of information in time division multiplex (TDM) formats.

Current time division multiplex (TDM) transmissions, as is well known, transfer analog amplitude information as digital values, such as by delta modulation or by pulse code modulation (PCM) wherein, amplitude information is sampled at periodically consecutive points of time and represented by binary words. Such binary words are transferred as data bytes in periodically consecutive time slots, which time slots, when allocated to a communication link, form a time channel. Switching of time slots between channels by time switches using time slot interchanges is well known and described in detail, for example in U.S. Pat. No. 3,770,895.

Analog-to-digital conversion logic, either in a line circuit interface such as described in the application of, R. Treiber, Ser. No. 903,458, now U.S. Pat. No. 4,161,633 a continuation of Ser. No. 773,713, filed on even data herewith, now abandoned, assigned to the same assignee as the present invention, or in a digital subset is controlled by microprocessor logic, with the same microprocessor logic being also adaptable to control central office switching to central office data bases. Each such subset or group of subsets is controlled by a dedicated microprocessor including a programmable memory including a memory update capability through its digital channel to the central office. While a single microprocessor could be dedicated to service each subscriber set, in accordance with an aspect of the invention, a group of subscribers can be serviced by each microprocessor by means of local distribution multiplexors utilizing microprocessor logic such that a common program memory would service and be accessible by, for example, thirty to sixty subscribers.

In accordance with the present invention, the aforedescribed control functions are distributed to the individual lines and trunks to the degree that it is determinable by the time and space switching functional elements of the central office whether the programmed line and switching control functions are local, at the central office, or distributed further down line. The distributed control technique of the present invention is most advantageously utilized in conjunction with an essentially non-blocking switching network which switches not only voice and data traffic (revenue traffic) but also switches "overhead traffic" accessing the various data bases; such as: translator inputs, man-machine interface data, billing and traffic collection devices, etc. While a number of digital electronic switching systems may be utilized with the present invention, a particularly suitable switching system is described by the aforementioned K. Geisken-J. Cotton, patent application. In accordance with a further aspect of the present invention, the digital switches have coupled thereto switching control instruction over the same paths which couple the speech signals thereto, since the speech path is the only available path over which a remote subscriber subset can send such control data, hence, digitized speech and digital control signals are multiplexed on a common communication path through the group switch to both establish, maintain and terminate communication between calling and called subscribers.

In accordance with another aspect of the present invention a half call technique is described wherein, for example, one line may comprise a two-wire coin box line while another line may comprise a business line to a PABX. Each processing function associated with each such line is programmed to know its own class of service and line signalling interface and also to know the common central interface and how to communicate via the group switch to another half call machine. Thus, a connection may be made between the two lines without having to know the complexities of how to handle all possible combinations of calls. In some instances it is required to transmit through or transmit signals in a forward and backward direction. These signals must be connected to the standard interface so as to be intelligible to other half call units.

SUMMARY OF THE INVENTION

The present invention comprises a system and method for a subscriber controlled distributed microprocessor control of the individual subscriber lines and trunks serviced by a telephone central or local office such that the speech channels are utilized for transmission of control data. A standardized hardware interface to a digital switching matrix for the distributed subscriber control is provided, and functions additionally to separate originating and terminating call halves to prevent interactions therebetween. A plurality of subscriber lines corresponding to the security block level, share a common memory and are coupled via termination multiplex lines to the switching matrix for bidirectionally transferring data therebetween, while simultaneously and via the same termination multiplex lines bidirectionally transferring data from the individual subscriber line control microprocessor private memories therebetween for implementation of distributed control over the speech channels. The digital switching matrix also receives, switches and transmits originating and terminating call halves, using simplified software, amongst the subscribers interconnected by the described network.

It is therefore a primary object of the present invention to provide a distributed control switching system for an expandable local or central office wherein subscriber lines and trunks communicate via a standardized hardware interface through a group switch;

Another object of the present invention is to provide uniformly manufacturable distributed control circuitry for each subscriber line or group of subscriber lines such that each distributed control provides control for a number of subscriber lines which is less than the security block level;

Another object of the present invention is to provide a digital switching system and control therefor without the duplication of switching and control circuitry of the prior art common control systems, while still safeguarding lines other than lines wherein a fault may occur;

Another object of the present invention is to provide a modular, rugged, survivable, solid state or SLI distributed control for a multiple subscriber switching system without the thruput limitations of stored program common control systems;

Another object of the present invention is to provide a microprocessor control per call in a multiple subscriber system;

Another object of the present invention is to provide a distributed control for a multiple subscriber system wherein the addition of additional subscriber lines or features to the system is readily achievable without adverse affect on the existing system, and wherein software is distributed only for the class of service per line, thereby providing both simplified hardware and software;

Yet another object of the present invention is to provide a distributed control of originating and terminating call halves, under subscriber control and separated by the switching matrix, thereby eliminating undesired interaction therebetween;

Yet another object of the present invention is to provide a fault tolerant distributed control for a multisubscriber system wherein all communications between subscriber line control units and system data bases is through a common group switch wherein no distinction exists in the group switch between, for example, a line-to-line call and a call to a translator, thereby eliminating expensive multiwire control busses.

Other objects and advantages of the invention will become apparent with reference to the following detailed description of a preferred embodiment and to the drawings wherein:

BRIEF DESCRIPTION OF THE DRAWINGS

FIG. 1 is a simplified block diagram of a distributed control switching system in accordance with the present invention.

FIG. 5 is illustrative of a call control unit and a line termination unit in accordance with the present invention.

DESCRIPTION OF THE PREFERRED EMBODIMENT

Figure 4:
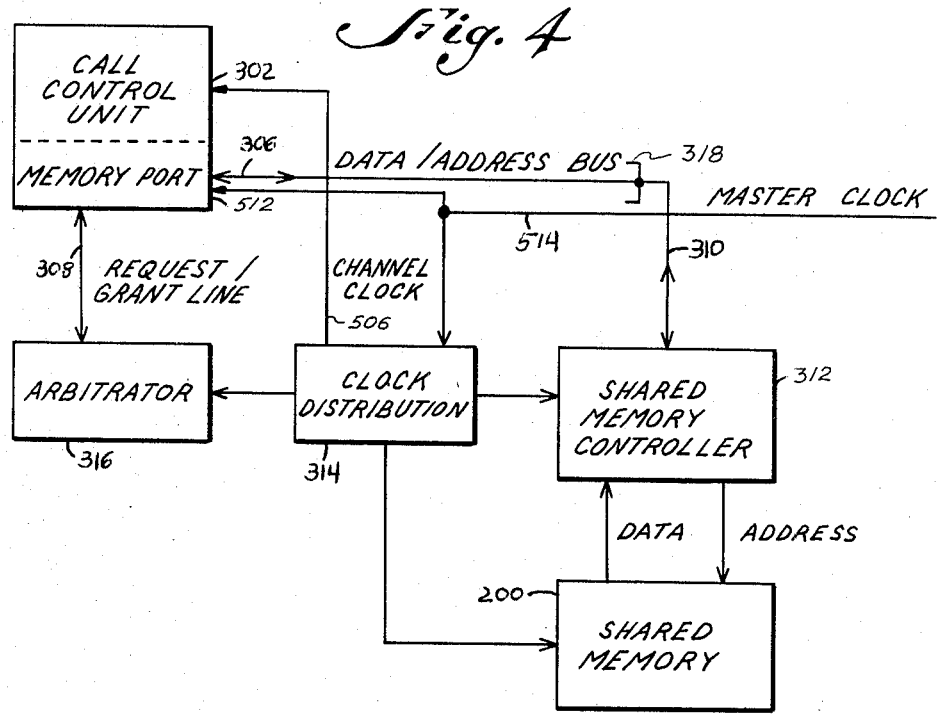
FIG. 4 is illustrative of a shared memory configuration in accordance with the present invention.

Referring now to FIG. 1, the distributed control switching system architecture is illustrated generally at 100. A group switch matrix 102, of the type described in greater detail with reference to the aforementioned patent application of K. Geisken, et al, Ser. No. 766,396, functions as the center of all system switching. Typically, such a switch is essentially non-blocking. The group switch matrix 102, which may be alternatively configured as a concentrator or deconcentrator or any other class of PCM switch, provides space switching and time slot interchange to interconnect any time slot on any incoming multiplex line to any other time slot on any other outgoing multiplex line. Switch 102 includes an internal path selection control for regulating traffic in an essentially non-blocking manner via the speech path to accommodate the distributed control on the subscriber lines. Diagnostic programs capable of locating faults down to the level of one replacement item, i.e. a PC board or module, is decentralized and include in its microprocessor control of the subscriber lines, with one microprocessor per security block, which security block may, for example, include from one to sixty lines. This decentralized diagnostic programming serves to inhibit interaction between fault location on a line and traffic on other lines. Since by this technique of switching diagnostics from central control to the individual microprocessor, processor thruput need not be maximized, and the distributed software may be structured to provide any level of maintenance and test capability. The multistage group switch 102 is illustrated in simplified manner, to show a first stage consisting of subgroups one, two and three through N at 104, 106, 108 and 110 respectively. The aforementioned internal path selection control for each aforementioned first stage subgroup of switches is illustrated at 112, 114, 116 and 118 respectively. At the M'th stage of the matrix 102, switching subgroups one through N are illustrated at 120 and 122 with their respective path selection controls at 124 and 126.

The switching matrix 102 is interfaced at a common hardware interface provided by a multiplexed group 148 of the subscriber line circuits 128, to which the individual subscriber lines are connected and are switched at the central or local office. Each multiplexed subgroup 148 has connected thereto the traffic from individual subscriber lines after analog-to-digital conversion by microprocessor controlled line circuits 128A, 128B, 128C and 128D, each of which is hereinafter singularly referred to as line circuit 128, also provide digital-to-analog conversion for return traffic back onto the two-wire analog lines and trunks 132 and 134 served thereby. Line circuit 128 includes a microprocessor such as an 8080 microprocssor, or other suitable microprocessor and services subscriber line. The elements of subscriber line circuit 128 are described in greater detail in application Ser. No. 773,713 of R. Treiber, (see U.S. Pat. No. 4,161,633) assigned to the same assignee as is the present invention. Individual digital subscriber lines 130, subscriber carrier system lines 136 and digital trunk groups 138 are coupled to the central office digital terminator 140 which provide for buffering and call control and which are directly switched as required by the group switch 102. Requisite data bases and translators illustrated at 142, and other digital data stores such as billing information storage 144 and service circuits 146 are coupled to the group switch. The translators included at 142 interpret digits dialed or keyed by subscribers as do conventional translators, but herein also are utilized to aid in implementing the distributed control function by operating with the only data communication path between line circuits 128 and group switch 102 provided by the speech paths, one of which is illustrated at 204. The translator architecture will be described in greater detail with reference to FIG. 6. Thus, the same switching network provides both a data communication path and a speech path between subscriber lines. Since the individual line circuits 128 control the establishing of paths to the switching network, the heretofore required central processor functions are effectively eliminated.

Figure 2:
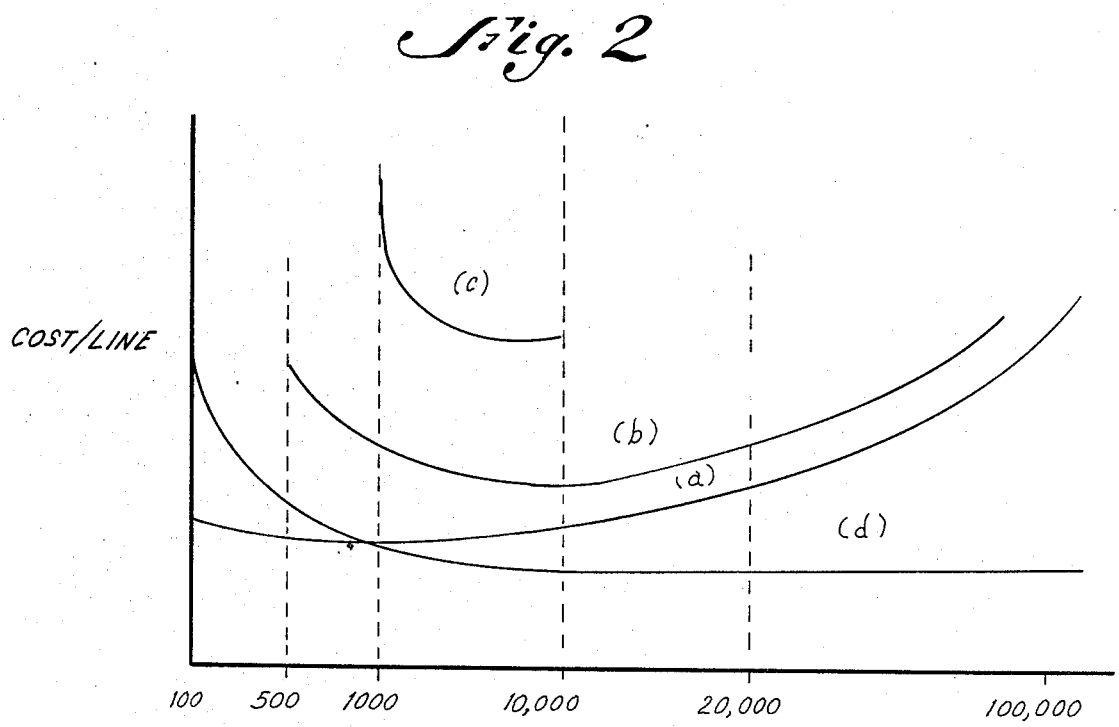
FIG. 2 is a series of curves illustrative of the economics of the present invention as compared to systems of the prior art.

Referring now to FIG. 2, curves (a) through (d) are illustrative of the cost per subscriber line achieved with the present system as compared with systems of the prior art. The present system is capable of modular expansion to serve a growing number of subscriber lines, for example, from one-thousand lines to one hundred thousand lines at a substantial savings over known prior art systems. This is done to the savings achievable with high volume manufacturing techniques for producing multiple microprocessor controlled line circuits with distributed control rather than large and costly wired or program logic central multiple line controls together with the requisite duplication inherrent in such prior art control to guard against catastrophic failure.

Curve (a) is representative of the well known electromechanical step-by-step switches of the prior art, which permitted direct control by each subscriber over the speech path by means of a line finding arrangement directly controlled by the subscriber dial. The system is expandable with office growth, over a wide range with a slowly increasing cost/line due to the inefficiencies and inflexibilities of the system as it grows larger. Curve (b) is representative of register/translator control of step-by-step switching of prior art in which register senders and a translator is utilized to add numbering plan and feature flexibility. Duplication of the common parts of the register senders and translation function is required which raises the cost per line curve at the low end.

Curve (c) is illustrative of prior art wired logic common control systems, such as the No. 5 crossbar switch. Such systems not only suffer from the aforedescribed equipment duplication problem, but are expandable over a relatively small range, i.e. eight-to-one versus a thousand-to-one or more of the present invention. Furthermore, the wired logic common control system does not enable direct subscriber control of switching over the speech path.

Curve (c) is also illustrative of the cost-line vs. number of lines characteristic of stored program control electronic switching systems of the prior art. As can be seen, at some maximum number of lines, there is a sharp cutoff, since system expansion is limited by the thruput capability of the processor(s).

Referring now to Curve (d), the cost per line vs. number of lines characteristic of the present system is illustrated. Since one control element, such as a microprocessor, per line or per group of lines is utilized, and since, as will be described, the present system in modular, uniformly manufacturable, and utilizes a standardized hardware interface to a group switch instead of communication via software channels as in the prior art, the present system is easily expandable, at almost uniform cost, from, for example, 1000 subscribers to 100,000 subscribers. As the switching system expands throughput capacity is automatically added. This plus the similar modular expansion of the group matrix removes the upper limit of expansion normally found with common control and stored program common central offices without any loss of feature flexibility. This modularity also permits the addition of new features and services on a module or modules without the need for extensive retesting of the existing features as is now a limitation in stored program common control systems.

Figure 3:
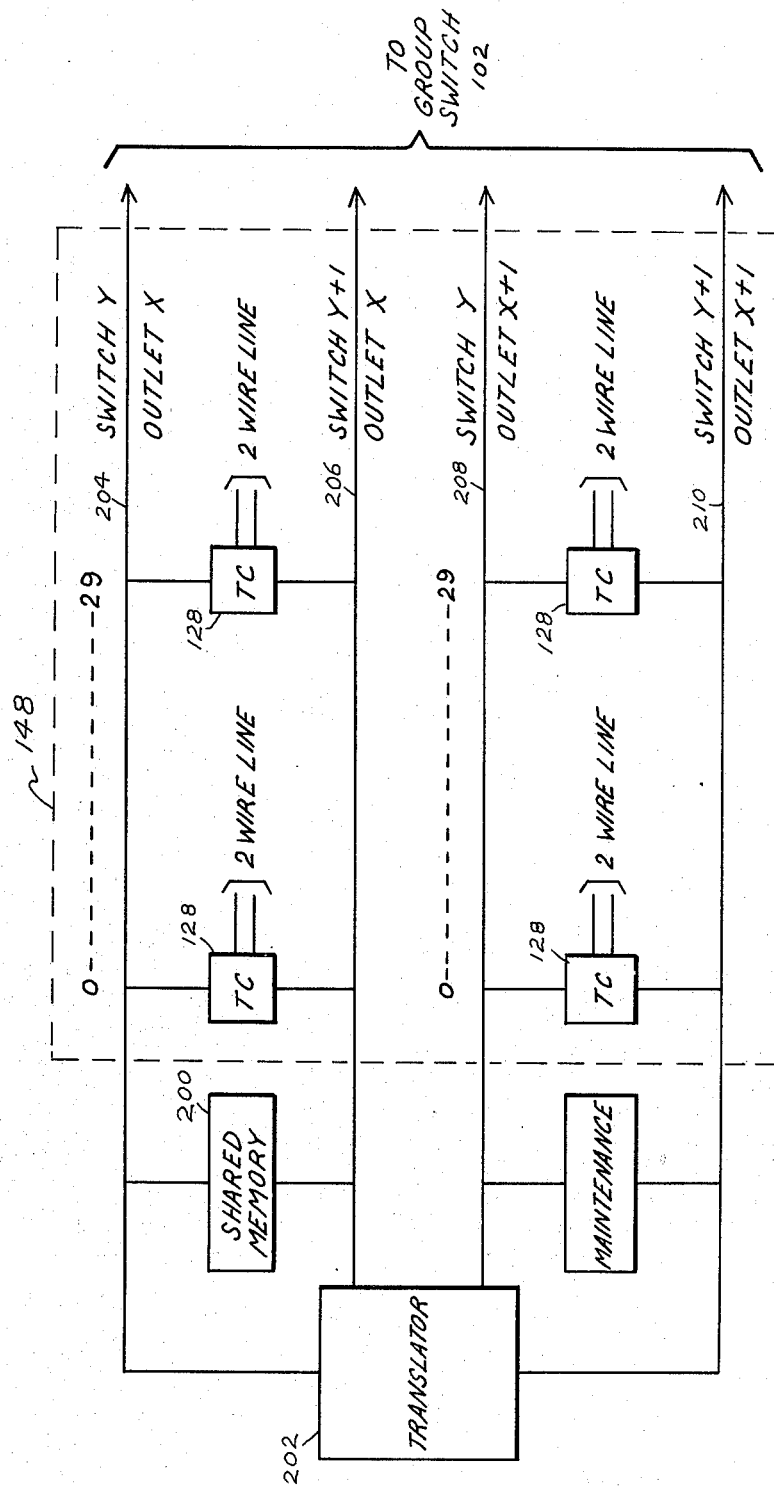
FIG. 3 is illustrative of the relationship of the shared memory of the present invention to other system elements.

Referring now to FIGS. 3, 4 and 5 the call control, shared memory and distributed control will now be described. Call control is provided on the basis of one line circuit circuit 128 containing one call control unit 302 per termination, and provides at different times processing for control of both the originating and terminating halves of a call. The call control unit (CCU) includes a microprocessor 402 with private memory 516, an interface 512 to a shared program memory, an interface 518 to a power supply unit, a pair of interface ports 204, 206 to switching network 102 shared by other microprocessors at other line circuits 128B, 128C, 128D, etc. and having an address capability of about 256K-bytes and a digital filtering capability. Broadly, the CCU 302, described with reference to FIG. 5, provides dc and low frequency control up to 300 Hz to provide battery feed and ringing current functions, voice frequency processing at 300–3800 Hz and call processing. The voice frequency processing is accomplished at voice frequency processor 500 under microprocessor 402 control via a bidirectional bus 513, as described in the aforementioned application, Ser. No. 773,713. Each two-wire subscriber line 132 is coupled to a high voltage interface and analog-to-digital converter 502 and digital-to-analog converter 504. The digital output of A/D converter 502 is digitally filtered by processor 500 and converted into bit stream such as a serial 14-bit linear PCM code supplemented by additional bits for controlling the group switch 102 and for communicating between different CCU's and translators. The digital filtering provides 2 to 4 wire conversion and compensates for the loss characteristics of the particular subscriber line or trunk 132. Microprocessor 402 is programmable to provide for equalization and loss and gain control equivalent to pad swiching. Further, the 300 to 3800 Hz outputs of A/D converter 502 are digitally filtered to provide tone detection. Processor 500 also generates digital signals and couples same to D/A 504 to generate audio signals in the 300–3800 Hz range for signaling busy-tone, ring-tone, etc. on the return subscriber line 132.

Dial pulses and equivalent tone signals are received and processed by microprocessor 402 to determine when access to common data bases and translators is required for further data. A set of instructions, pertaining to the line/trunk service options of the individual line, is accessible from the shared memory 200 via memory port 512 and data/address bus lines 306. Such access is confined to a single security-block or bus and thus does not use switch matrix 102 to obtain this data. As such, this represents a distribution of software control instructions to the individual lines/trunks so that different line/trunk blocks can freely contain different combinations of software instructions, representing different line/trunk service classes and feature bits. Thus, it is not necessary to store the totality of all software instructions on a distributed basis, thereby saving in storage. Also, different combinations of software instruction interaction with each other via standard interface lines 204 and 206 is prevented by group switch 102. This provides facility in feature modification, addition, deletion. Also a particular microprocessor only accesses the originating or terminating half of the software as dictated by the direction of the call set up. Data address bus 306 and request/grant lines 308 are coupled to memory port 512, together with a master clock on line 514, and provide the aforedescribed intermodule communication. The master clock is also coupled to memory port 512 and the channel clock is also coupled to call control unit 302. The interface ports to switching network 102 comprise output switches 520 and 522 and input switches 524 and 526.

The distributed control herein provided, whereby call control processing is distributed to enable each call to utilize exclusive use of a microprocessor for the duration of each call eliminates the previous requisites for complex sharing algorithms for sharing a single processor among several calls. Distributed control may be provided by means of a microprocessor per erlang or per termination. In accordance with the present invention, a microprocessor per termination, i.e. per line/trunk, is provided, which comprehends, for example, a microprocessor per subscriber line. In any event, a microprocessor is dedicated to a line at least during the time that a call is being placed over that line.

Referring to FIG. 3, a sixty-termination shared program arrangement is illustrated, which may be considered as one security block. Each termination circuit 128 interfacing the subscriber lines to the group switch, as aforedescribed, provides two-wire to four-wire conversion, digitzes incoming analog signals, provides digital filtering and other digital voice frequency processing and call control. The microprocessor therein, including a private memory, which performs call control, translation, path selecting control signal generation and various diagnostic functions is coupled to a shared memory 200 via a memory port in circuit 128. In FIG. 3, sixty termination circuits 128 share memory 200. Each line such as line 212 from termination circuit 128 is multiplexed into a 32-channel group 204, i.e. common communications path, carrying 14-bit linear PCM serially at an 8 KHz sampling rate, two of which channels may be allocated for communication with other system modules in accordance with timing signal from the shared memory 200 and the system clock.

Each terminating processor will typically include 4K-bytes of private memory and access to the shared memory utilized by a plurality of microprocessors and which shared memory typically has an address capability of 256K-bytes.

Both program and fixed data memories are shared; however, the private data memory which also provides "bootstrap" start up instructions for each microprocessor is not shared, in order that microprocessor interaction is minimized. In any memory sharing system, potential problems due to processor contention for memory, access time required to access particular segments of shared memory and hardware and software complexity to overcome the foregoing exist.

Shared memory 200 may comprise a multiport memory as shown by FIG. 4 wherein each microprocessor 402 in call control unit 302 has access thereto via its own memory port such as port 512 with access through data/address bus 306 which is multiplied to other memory ports at the multiple point 318 and request/grant line 308, which is individual to the memory port 512. Only sixty lines or less contend for the shared memory as illustrated. An arbitrator circuit 316 enables only one microprocessor at a time to access the shared memory 200 to eliminate problems of processor contention. A shared memory controller 312 controls the addressing of shared memory 200 and the transfer of data therefrom to memory port 512 via data/address bus 306, which is bidirectional. Parity is generated and checked for both data and addresses at memory port 512 and by controller 312. Shared memory 200 may comprise semiconductor RAM chips organized into 32-bit words to provide the aforementioned 256K-byte addressing capability. A master clock in clock distribution circuit 314 generates the various synchronous timing signals required by arbitrator 316, memory ports such as port 512, controller 312 and shared memory 200.

The translater 202, the microprocessor controlled line circuits 128 (sixty as illustrated by FIG. 3) and the shared memory 200 interface the group switch via lines 204, 206, 208 and 210. A typical switch y, outlet x thereof is interfaced by line 204, and outlet x+1 thereof by line 208. Another typical switch Y+1 outlet X thereof is interfaced by line 206 and outlet x+1 thereof by line 210. As aforementioned each of lines 204 through 210 has multiplexed thereon 32 time slots. As can be seen each speech termination circuit 128 is connected to two termination multiplexes carrying the 30 channels and having synchronized timing such that the outlets of the termination circuits and the inlets of group switch 102 are synchronized to provide the requisite parallel to serial conversion and in reverse the serial to parallel conversion therebetween. The microprocessor 402 private memory 516 may comprise a masked programmed ROM and PROM. The private memory also includes a rewrite memory capability in the order of 4K to 8K bytes for resident software and variable data which may include class of service data.

Figure 6:
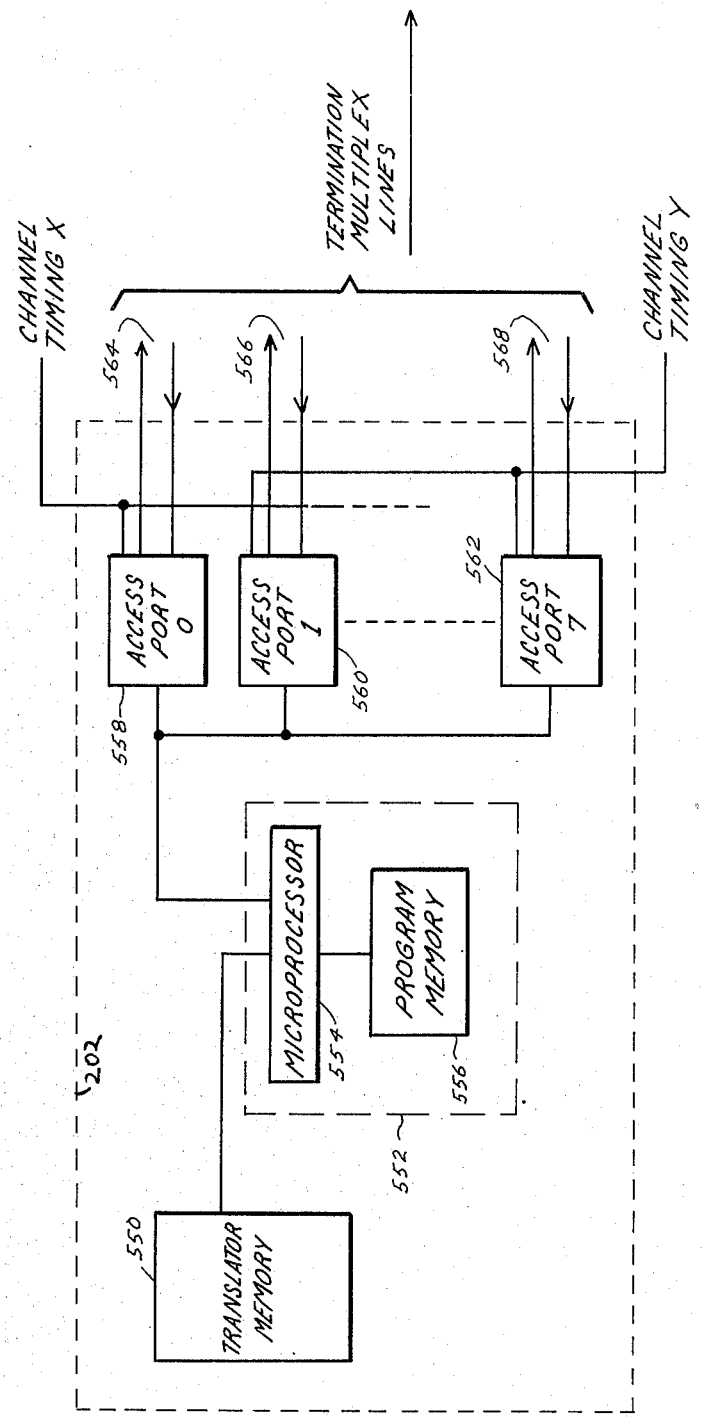
FIG. 6 is illustrative of a translator subsystem configuration utilized in accordance with the present invention.

Referring now to FIG. 6, the translator 202 is described. Translator 202 is particularly advantageously utilized in a distributed control organization, and operates with the only data communication path between security block modules and other subsystems of the exchange being provided by the speech switch 102. The deficiencies of prior art translators in centralized stored program exchange systems in coping with office and customer data modifications are overcome by the present system. Translator 202 includes a memory 550; a control processor 552 which includes a microprocessor 554 and its associated program memory 556; and translator access ports to group switch 102, three of eight of which access ports are shown at 558, 560 and 562. The translator may be replicated as needed for increased office traffic, reliability and survivability.

The translator receives class of service information of various types, charging data, statistical information, etc. while also performing the normal translation function; i.e. directory number to equipment number translation (DN/EN) by indexing a table in memory 550; equipment number to directory number translation (EN/DN); area code or office code to trunk route translation; and trunk route to equipment number translation.

Each speech termination circuit 128 is coupled to two termination multiplex lines as described with reference to FIG. 3, each termination multiplex line carrying thirty-two channels, and each termination multiplex line being coupled to a terminal switch outlet, which in turn is coupled to the group switch 128 inlets. By way of example, 960 terminations circuits identical to circuit 128 are coupled to the group switch in a typical office configuration. The thirty termination circuits coupled to one termination multiplex each have a second interface connected to a second termination multiplex, hence the two termination multiplexes sharing the thirty termination circuits are connected to the same numbered outlet on two consecutive stage one switches. The sixty termination circuits sharing a program memory are converted to four termination multiplexes, hence each pair of stage one switches will have four sets of four termination multiplexes connected thereto. Each speech termination circuit 128 includes, therefore, two equipment numbers, and the DN/EN translator function continuously monitors the state, i.e. busy-free condition of each originating call half and termination call half of the speech termination circuit. The response to a request for a DN translation will contain a free termination equipment number and an indication as to whether the alternative equipment number is busy, free or booked. If both terminations are busy, this information is returned to microprocessor 552, the microprocessor controlling an originating call half selects a network path to the terminating equipment number and signals the requisite information for call set-up. The microprocessor controlling the terminating half portion of the call sends a confirmation signal to the DN/EN translator, or other translator function, to confirm that the termination is now busy and to identify the equipment originating the call.

The translator memory 550 may comprise, a CCD memory or a magnetic bubble memory or other solid state memory capable of containing at least 90-K words of storage with 80K words thereof for translator memory and 10K words thereof for translator program backup memory, with word lengths of, for example, 16, 24 or 32 bits dependent upon data structure. Access ports 558 through 562 are electrically identical with speech termination circuits to the switching matrix and are identifiable and selectable by equipment number in like manner as are the termination circuits. The distribution of the aforementioned access ports is such that a switch module failure will not disable more than one port and any stage-one switch failure will not disable more than half of the ports. The equipment numbers allocated to the access ports are such that an algorithm in program memory 556 can derive any other equipment number from any given equipment number. Functionally, each access port includes means for selecting from the PCM multiplex line the contents of the channel defined by its equipment number, means for identifying microprocessor-to-microprocessor control messages in the channel, a buffer register to hold one or more such messages, an output buffer, means for inserting such messages into the correct channel on the outgoing termination multiplexes 564, 566 and 568; and means for outputting messages to hold the transmission path idle while the translator microprocessor 554 is generating output data.

Access ports 558, 560 and 562 also include input lines as indicated. Data is extracted from the translator memory 550 in response to messages received on the input ports and reloading and modification of data in memory 550 is microprocessor controlled in accordance with programming in program memory 556. Processor 554 may be the same microprocessor utilized in the termination circuits 128, and is also illustrated at 402 as a portion of the call control unit 302. The translator memory 550 includes the requisite translation tables. Typically, translation access exceeding four milliseconds has a probability of less than one in a thousand and the average time to complete translation access is under two milliseconds. Customer data modification and office data modification are accomplished by reprogramming of memory 556, to provide for added customer features or extension of the number of lines or trunks serviced by an office.

While the present invention has been described in connection with a preferred embodiment thereof, it is to be understood that additional embodiments, modifications and applications which will become obvious to those skilled in the art are included within the spirit and scope of the invention as set forth by the claims appended hereto.

I claim:

1. A distributed control digitally switched multiple subscriber system for selectively interconnecting a plurality of subscriber lines, comprising:

a plurality of interface means, each of which provides an access for calls from at least one subscriber line to a multiplexed common communication path upon which a plurality of said calls are multiplexed and includes means for deriving at least digital path selection control signals for each call coupled thereto, said interface means further including means for coupling said path selection control signals onto said common communication path;

a switching matrix means coupled to said common communication path for selectively interconnecting said subscriber lines by providing a path thru said switching matrix means in response to said path selection control signals;

means at each of said interface means for deriving digitized speech signals, such that said speech signals and said digital path selection control signals are transmitted on said common communication path; and processing means for digitally filtering said calls, and including a memory associated with said processing means, for storing control information used by said means for deriving digitized speech signals.

2. A distributed control system in accordance with claim 1, wherein said switching matrix means comprises a multistage group switch.

3. A distributed control system in accordance with claim 1, wherein said means for deriving said path selection control signals for a particular call on a particular line includes a microprocessor and a memory associated therewith, and means for accessing said microprocessor during the time that said particular call is placed on said particular line, and wherein said processing means for digitally filtering said calls is implemented by said microprocessor.

4. A distributed control system in accordance with claim 1, wherein said digitized speech signals are serially coupled to said common communication path.

5. A distributed control system in accordance with claim 1 further comprising:
translator means for providing call translation for calls coupled thereto from said plurality of interface means; and access port means for coupling said translator means to said common communication path.

6. A distributed control system in accordance with claim 2, wherein each of said calls includes an originating call half and a terminating call half, and wherein said interface means further includes means for coupling said originating call halves to said common communication path and for receiving terminating call halves from said common communication path, such that said switching matrix means independently switches said originating and terminating call halves.

7. In a continuously expandable switching system for providing a plurality of communications among a plurality of subscriber lines and including a distributed call control processor dedicated to each line for the duration of each subscriber call:
subscriber line circuit means having at least one of said subscriber lines terminated thereat, for deriving digital path selection control signals and for deriving digital signals representative of that portion of said plurality of communications which is associated with the subscriber line or lines terminated at said subscriber line circuit means;
means for transmitting said digital path selection control signals and said digital signals representative of said communications on a common communication path such that independent path selection control is provided for each of said communications on said subscriber lines; and switching matrix means having a plurality of said common communication paths coupled thereto from a plurality of subscriber line circuit means for switching said communications among said subscriber lines in accordance with said digital path selection control signals.

8. In a continuously expandable switching system in accordance with claim 7, further comprising:

means for coupling said plurality of common communication paths from said plurality of line circuit means to said switching matrix means such that additional subscriber lines or trunks may be added to said system without disconnection of existing subscriber lines and such that a standardized interface is provided to said switching matrix means from said subscriber line circuit means.

9. In a continuously expandable switching system, in accordance with claim 7, wherein said subscriber lines are analog lines or trunks and wherein the communications on said analog lines or trunks are in the form of subscriber calls wherein each of said calls includes an originating call half and a terminating call half and wherein said subscriber line circuit means further includes:

means for coupling said originating call halves to said common communication path and for receiving terminating call halves from said common communication path such that said originating and terminating call halves are independently controlled.

10. In a continuously expandable switching system for providing communication among a plurality of subscriber lines, in accordance with claim 9, wherein said subscriber line circuit means includes means for deriving class of service data and for coupling said class of service data onto said common communication path.

11. A method for providing distributed control for a digitally switched multiple subscriber system comprising the steps of:

interfacing at an interface between a plurality of telephone subscriber lines and a digital switching matrix, digitized speech signals, derived from analog speech signals on a plurality of analog subscriber lines, to a plurality of common communication paths upon which said digitized speech signals are multiplexed together with at least digital path selection control signals for each call from said subscriber lines coupled thereto;

interconnecting said subscriber lines thru said digital switching matrix over paths set up in said matrix in response to said path selection control signals; and transmitting said digitized speech signals at said interface together with said digital path selection control signals such that said speech and control signals are transmitted together on said common communication paths.

12. A method in accordance with claim 11, wherein said digital path selection control signals are provided on a per line basis.

13. A method in accordance with claim 11, wherein said digital path selection control signals are provided on a per call basis.

* * * * *